United States Patent
De Villele et al.

(10) Patent No.: US 10,654,589 B2
(45) Date of Patent: May 19, 2020

(54) AVIONIC DISPLAY SYSTEMS AND METHODS FOR GENERATING VERTICAL SITUATION DISPLAYS INCLUDING INSTABILITY PREDICTION AND AVOIDANCE SYMBOLOGY

(71) Applicant: HONEYWELL INTERNATIONAL INC., Morris Plains, NJ (US)

(72) Inventors: Dorothee De Villele, Haute-Garonne (FR); Rajesh Chaubey, Karnataka (IN); Sharanabasappa Advani, Karnataka (IN); Veeralla Sai V Yashodhar, Karnataka (IN); Ranju Thomas Pulikot, Karnataka (IN); Abhishek Gupta, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 131 days.

(21) Appl. No.: 15/469,763

(22) Filed: Mar. 27, 2017

(65) Prior Publication Data

US 2018/0273200 A1 Sep. 27, 2018

(51) Int. Cl.
*B64D 45/08* (2006.01)
*G08G 5/00* (2006.01)
(Continued)

(52) U.S. Cl.
CPC ........... *B64D 45/08* (2013.01); *B64C 9/32* (2013.01); *G08G 5/0021* (2013.01); *G08G 5/0091* (2013.01); *G08G 5/025* (2013.01)

(58) Field of Classification Search
None
See application file for complete search history.

(56) References Cited

U.S. PATENT DOCUMENTS

| 6,154,151 A * | 11/2000 | McElreath ............. G01C 23/00 340/961 |
| 6,584,382 B2 * | 6/2003 | Karem ................. G05D 1/0038 701/3 |

(Continued)

FOREIGN PATENT DOCUMENTS

EP 3056864 A1 8/2016

OTHER PUBLICATIONS

Extended EP Search Report for Application No. 18162998.1 dated Aug. 27, 2018.

(Continued)

*Primary Examiner* — Nicholas K Wiltey
(74) *Attorney, Agent, or Firm* — Lorenz & Kopf, LLP (57) ABSTRACT

Avionic display systems and methods are provided for generating avionic displays including instability prediction and avoidance symbology, such as dynamically-adjusted drag device deployment cues. In one embodiment, the avionic display system includes a controller and an avionic display device, which is coupled to the controller and on which an avionic display, such as a Vertical Situation Display (VSD), is generated. The controller is configured to: (i) project whether an unstable aircraft state will occur during an approach flown by an aircraft; (ii) when an unstable aircraft state is projected to occur, determine whether implementation of an optimized drag device deployment scheme can prevent the projected occurrence of the unstable aircraft state; and (iii) if determining that the implementation of the optimized drag device deployment scheme can prevent occurrence of the projected unstable aircraft state, generating symbology on the avionic display indicative of the optimized drag device deployment scheme.

15 Claims, 6 Drawing Sheets

(51) Int. Cl.
   *B64C 9/32* (2006.01)
   *G08G 5/02* (2006.01)

(56) References Cited

U.S. PATENT DOCUMENTS

| | | | | |
|---|---|---|---|---|
| 6,629,023 | B1* | 9/2003 | Silder, Jr. | G05D 1/0676 244/114 R |
| 7,068,187 | B2* | 6/2006 | Ishihara | G05D 1/0676 340/945 |
| 7,132,960 | B2* | 11/2006 | Glover | B64D 45/04 340/945 |
| 7,212,135 | B1* | 5/2007 | Lynch | G08G 5/0065 244/183 |
| 7,436,323 | B2* | 10/2008 | Ishihara | G01C 23/00 340/951 |
| 7,471,997 | B2* | 12/2008 | Tezuka | G05D 1/0684 342/33 |
| 7,957,878 | B2* | 6/2011 | Rado | B60T 8/1703 244/1 R |
| 8,346,412 | B2 | 1/2013 | Lacaze et al. | |
| 8,436,750 | B2* | 5/2013 | Fabre | G08G 5/0086 340/951 |
| 8,864,081 | B2 | 10/2014 | Constans et al. | |
| 8,892,275 | B2 | 11/2014 | Constans et al. | |
| 9,310,222 | B1* | 4/2016 | Suiter | G01C 23/005 |
| 9,440,747 | B1 | 9/2016 | Welsh et al. | |
| 10,134,289 | B2* | 11/2018 | Moravek | G08G 5/0039 |
| 2002/0039070 | A1* | 4/2002 | Ververs | G01C 23/00 340/901 |
| 2004/0044446 | A1* | 3/2004 | Staggs | G05D 1/0676 701/16 |
| 2005/0261813 | A1* | 11/2005 | Ryan | B64C 25/426 701/16 |
| 2006/0025901 | A1* | 2/2006 | Demortier | G05D 1/0676 701/16 |
| 2006/0265110 | A1* | 11/2006 | Ferro | G01C 23/00 701/3 |
| 2007/0142982 | A1* | 6/2007 | Lorido | G08G 5/025 701/16 |
| 2008/0162092 | A1* | 7/2008 | Coulmeau | G05D 1/0676 703/2 |
| 2008/0195301 | A1* | 8/2008 | Fabre | G08G 5/0021 701/120 |
| 2008/0249675 | A1* | 10/2008 | Goodman | B64C 25/426 701/16 |
| 2008/0262665 | A1* | 10/2008 | Coulmeau | G08G 5/0039 701/16 |
| 2009/0018713 | A1* | 1/2009 | Coulmeau | G08G 5/0013 701/3 |
| 2009/0043434 | A1* | 2/2009 | Deker | G05D 1/0676 701/16 |
| 2009/0048724 | A1* | 2/2009 | Caule | B64C 25/426 701/16 |
| 2009/0319105 | A1* | 12/2009 | Conner | G08G 5/02 701/16 |
| 2009/0325131 | A1* | 12/2009 | Cernasov | G06F 3/012 434/30 |
| 2010/0036551 | A1* | 2/2010 | Lacaze | G01C 23/00 701/18 |
| 2010/0191394 | A1* | 7/2010 | Villaume | G05D 1/0083 701/16 |
| 2010/0286852 | A1* | 11/2010 | Bouquet | G01C 21/005 701/17 |
| 2010/0318244 | A1* | 12/2010 | Gomez | G01C 21/00 701/3 |
| 2011/0082605 | A1* | 4/2011 | Coulmeau | G08G 5/045 701/14 |
| 2011/0166723 | A1* | 7/2011 | Valentova | G08G 5/02 701/16 |
| 2011/0202208 | A1* | 8/2011 | Karnik | G07C 5/0816 701/7 |
| 2011/0208374 | A1* | 8/2011 | Jayathirtha | G05D 1/0676 701/5 |
| 2012/0053760 | A1* | 3/2012 | Burnside | G05D 1/0676 701/3 |
| 2013/0204470 | A1* | 8/2013 | Luckner | G08G 5/025 701/18 |
| 2013/0218374 | A1 | 8/2013 | Lacko et al. | |
| 2013/0245860 | A1* | 9/2013 | Cooper | B64D 45/00 701/14 |
| 2014/0039731 | A1* | 2/2014 | Leberquer | B64C 19/00 701/3 |
| 2014/0343765 | A1* | 11/2014 | Suiter | G08G 5/0056 701/18 |
| 2014/0343766 | A1* | 11/2014 | Le Gall | B64D 45/04 701/18 |
| 2015/0123912 | A1* | 5/2015 | Nikolic | B64D 43/00 345/173 |
| 2016/0004374 | A1* | 1/2016 | Kneuper | G06F 3/0416 345/173 |
| 2016/0085239 | A1 | 3/2016 | Boyer et al. | |
| 2016/0229554 | A1* | 8/2016 | Kawalkar | G01C 23/005 |
| 2017/0168658 | A1* | 6/2017 | Lacko | G01C 23/005 |
| 2017/0249849 | A1* | 8/2017 | De Prins | G01C 23/005 |
| 2017/0323573 | A1* | 11/2017 | Decker | B64D 31/02 |
| 2018/0233056 | A1* | 8/2018 | Liberman | G08G 5/025 |

OTHER PUBLICATIONS

Roberto Salvador Felix Patron, et al.; Vertical profile optimization for the Flight Management System CMA-9000 using the golden section search method; 978-1-4673-2421-2/12/$31.00 © 2012 IEEE.
Airbus; Flight Operations Briefing Notes; Approach Techniques Flying Stabilized Approaches; FOBN Reference : FLT_OPS-APPR-SEQ 01-REV 02-Oct. 2006.

* cited by examiner

AVIONIC DISPLAY SYSTEMS AND METHODS FOR GENERATING VERTICAL SITUATION DISPLAYS INCLUDING INSTABILITY PREDICTION AND AVOIDANCE SYMBOLOGY

TECHNICAL FIELD

The following disclosure relates generally to avionic display systems and, more particularly, to avionic display systems and methods for generating vertical situation displays including instability prediction and avoidance symbology, such as dynamically-adjusted drag device deployment cues.

BACKGROUND

Aircraft are commonly equipped with Flight Management Systems (FMSs), which automate flight planning and other navigational tasks to reduce pilot workload. One such task is the calculation of an optimal vertical descent profile for reference during approach and landing. The FMS-computed vertical descent profile is ideally closely flown by a pilot such that the aircraft arrives at a desired horizontal (ground) distance ahead of its destination runway in an appropriate energy state; that is, at an altitude (commonly expressed as "Height Above Threshold") and airspeed allowing adequate dissipation of the aircraft energy content during final approach, touchdown, and rollout. To facilitate adherence with the FMS-computed vertical descent profile, avionic display systems commonly present the pilot with a graphical depiction of the vertical descent profile on a two dimensional (2D) avionic display, which is seen from a vertically-oriented perspective and which is commonly referred to as a "Vertical Navigation (VNAV) display" or a "Vertical Situation Display (VSD)." In addition to providing graphics representative of the FMS-computed vertical descent profile, the VSD also includes symbology indicative the current vertical aircraft position, runway ground level, and other pertinent flight parameters.

Even when afforded the assistance of a well-designed VSD, pilots may find it difficult to follow an FMS-computed vertical descent profile under actual or "real world" flight conditions. Any combination of dynamic factors can result in significant deviations from the FMS-computed vertical descent profile including rapidly shifting wind conditions, excessive aircraft instability, delay in implementation of high-lift configuration extensions, and tactical interventions by Air Traffic Control (ATC), to list but a few examples. Deviations from the FMS-computed vertical descent profile can contribute to undesired penalties in fuel consumption, operational costs, and noise emissions, as well as an increased likelihood of unstable approaches, hard landings, and go around procedures potentially exacerbating air traffic congestion. While not all deviations from the FMS-generated vertical descent profile are avoidable, an appreciable number of such deviations are avoidable and occur nevertheless due to various contributing factors. Such contributes factors may include pilot difficulty in anticipating excessive aircraft instability during approach and descent due to adverse weather conditions, rapidly changing weather conditions, and/or last moment landing parameter changes.

There thus exists an ongoing need for avionic display systems and methods, which generate symbology useful in decreasing aircraft deviations from computed vertical descent profiles during approach and landing. Ideally, embodiments of such avionic display systems and methods would enhance pilot awareness and decision-making with respect to the anticipated occurrence and avoidance of aircraft instability during approach and landing. Other desirable features and characteristics of the present invention will become apparent from the subsequent Detailed Description and the appended Claims, taken in conjunction with the accompanying Drawings and the foregoing Background.

BRIEF SUMMARY

Avionic display systems are provided for generating avionic displays including instability prediction and avoidance symbology, such as dynamically-adjusted drag device deployment cues. In one embodiment, the avionic display system includes a controller and an avionic display device, which is coupled to the controller and on which an avionic display, such as a Vertical Situation Display (VSD), is generated. The controller is configured to: (i) project or predict whether an unstable aircraft state will occur during an approach flown by an aircraft; (ii) when an unstable aircraft state is projected to occur, determine whether implementation of an optimized drag device deployment scheme can prevent the projected occurrence of the unstable aircraft state; and (iii) if determining that the implementation of the optimized drag device deployment scheme can prevent occurrence of the projected unstable aircraft state, generate symbology on the avionic display indicative or representative of the optimized drag device deployment scheme. In certain instances, additional symbology of may also be generated on the avionic display, such as graphics representative of a projected vertical trajectory graphic corresponding to the optimized drag device deployment scheme and converging toward a computed vertical trajectory when the A/C vertical position if offset from the computed vertical descent profile.

In another embodiment, the avionic display system includes an avionic display device on which a VSD is generated. A controller is operably coupled to the avionic display device and configured to: (i) establish a first drag device deployment scheme to be followed during an approach flown by an aircraft; and (ii) generate the VSD to include a model vertical speed profile (that is, an ideal vertical descent profile calculated by an FMS or other computer) and projected vertical speed profile corresponding to the first drag device deployment scheme. In certain implementations, the controller may be further configured to establish a horizontal (ground) distance at which the aircraft should be stabilized ahead of the destination runway (hereafter, a "stability distance"). The controller may also estimate a future airspeed of the aircraft at the stability distance, and project the occurrence of an unstable aircraft state if the future airspeed of the aircraft exceeds a target airspeed by more than a maximum acceptable threshold. In response to the projected occurrence of an unstable aircraft state, the controller may generate an alert on the VSD. Additionally, or alternatively, the controller may generate symbology on the VSD indicative of an optimized drag device deployment scheme when determining that implementation optimized drag device deployment scheme can prevent the projected occurrence of the unstable aircraft state.

Methods carried-out by an avionic display system are further provided. In an embodiment, the method includes the steps or processes of generating a VSD (or other avionic display) on an avionic display device, projecting whether an unstable aircraft state will occur during an approach flown by an aircraft, and determining whether implementation of an optimized drag device deployment scheme can prevent the projected occurrence of the unstable aircraft state when projected to occur. The method further includes the step of generating symbology on the VSD indicative of the optimized drag device deployment scheme if determining that occurrence of the projected unstable aircraft state can be prevented by implementation of the optimized drag device deployment scheme. Additionally, in at least some implementations, a visual alert may be generated on the VSD if determining that the projected unstable aircraft state cannot be prevented by implementation of the optimized drag device deployment scheme.

BRIEF DESCRIPTION OF THE DRAWINGS

At least one example of the present disclosure will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. Furthermore, terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements.

The following describes avionic display systems and methods for generating avionic displays including instability prediction and avoidance symbology, which assist in the avoidance of predicted aircraft (A/C) instability during approach and landing. The instability prediction and avoidance symbology can include, for example, dynamically-adjusted drag device deployment cues, which are generate on a Vertical Situation Display (VSD) or other avionic display. The drag device deployment cues are "dynamically-adjusted" in that the sequence, anticipated timing, and other aspects of the deployment cues may be repeatedly updated (e.g., on a real time basis) to avoid or minimize the likelihood of predicted A/C instability due to an improper energy state when reaching a predetermined horizontal (ground) distance ahead of a landing reference point (e.g., the touchdown zone of a destination runway) at which sufficient A/C stabilization should be ensured to proceed with the landing attempt (hereafter, the "stabilization distance"). Collectively, the drag device cues form an optimized drag device deployment scheme, which may be determined by the avionic display system utilizing a drag device deployment optimization algorithm. If multiple optimized drag device deployment schemes are established, the algorithm may further select a preferred drag device deployment scheme based upon one or more selection criteria, such as relative noise emissions, anticipated passenger comfort levels, projected fuel consumption, or the like. The avionic display system may then present the optimized drag device deployment scheme on the VSD (or other avionic display) as a series of drag device deployment cues, which indicate the order and timing of drag device deployment corresponding to the optimized drag device deployment scheme.

In certain embodiments of the avionic display system, the VSD (and/or another avionic display) may be generated to include additional symbology useful in piloting an A/C to avoid predicted unstable states and/or to recapture a computed vertical descent profile from which the A/C has deviated. For example, in one implementation, the VSD may be generated to further include a recovery speed profile graphic, which visually conveys a projected speed profile of the A/C during approach and landing. In still further implementations, the avionic display system may provide certain alerting functions related to instability prediction and avoidance. In such implementations, the avionic display system may selectively generate visual warnings on the VSD if the algorithm is unable to establish an optimized drag device deployment scheme capable of precluding or preventing the anticipated unstable A/C state; e.g., due to an inability if the A/C to recapture the calculated vertical descent profile at an acceptable energy state ahead of the stability distance. An exemplary embodiment of an avionic display system suitable for generating VSDs (and possibly other avionic displays) including instability prediction and avoidance symbology, such as dynamically-adjusted drag device deployment cues, will now be described in conjunction with FIG. 1.

Figure 1:
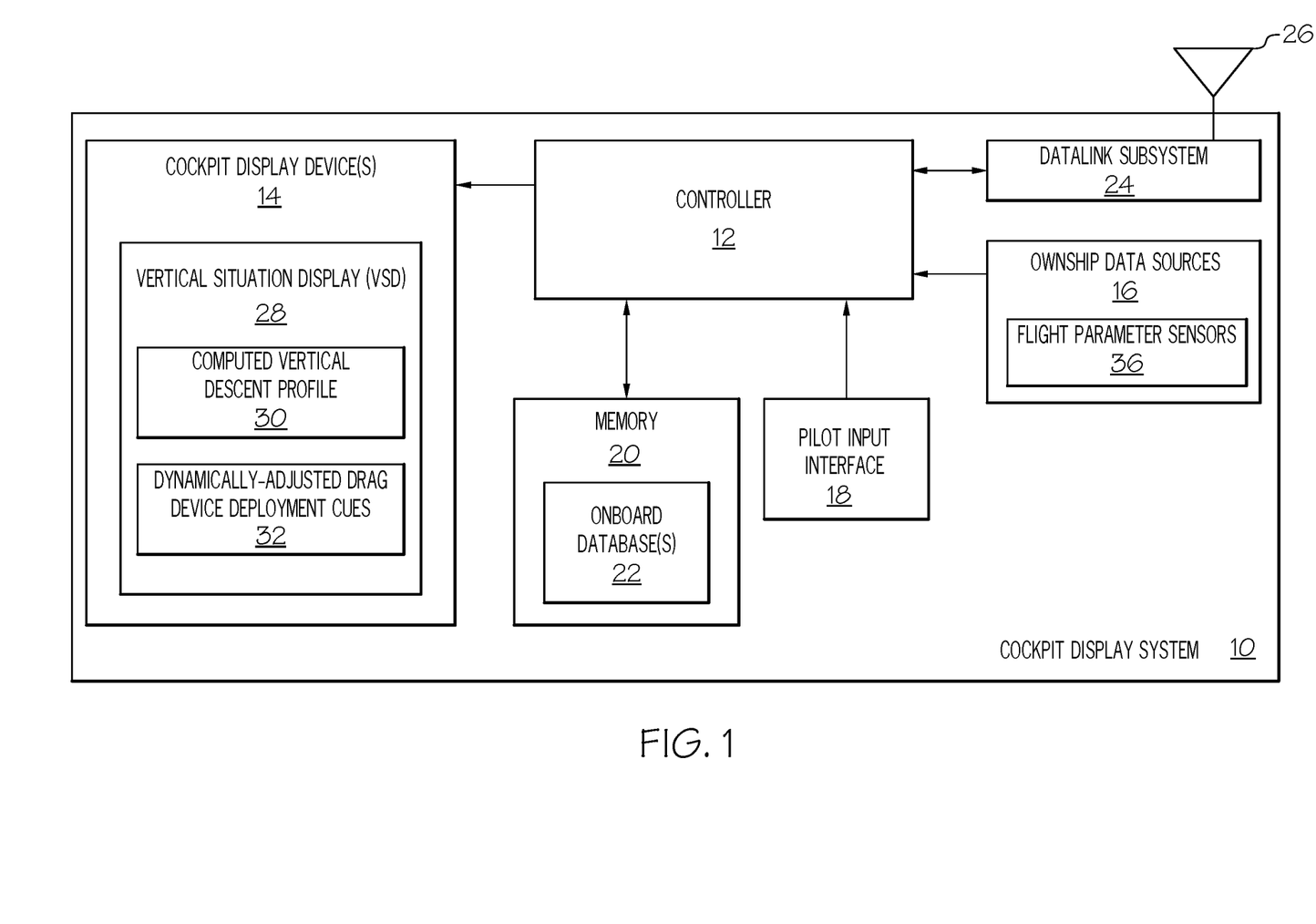
FIG. 1 is a block diagram of an avionic display system illustrated in accordance with an exemplary and non-limiting embodiment of the present disclosure.

FIG. 1 sets-forth a block diagram of an avionic display system 10, which is illustrated in accordance with an exemplary and non-limiting embodiment of the present disclosure. As schematically illustrated in FIG. 1, avionic display system 10 includes the following components or subsystems, each of which may be comprised of one device or multiple interconnected devices: (i) a controller 12, (ii) at least one avionic display device 14, (iii) ownship A/C data sources 16, (iv) a pilot input interface 18, (v) a memory 20 containing any number of onboard databases 22, and (vi) a datalink subsystem 24 including an antenna 26. Controller 12 includes at least first, second, third, and fourth inputs, which are operatively coupled to ownship A/C data sources 16, to pilot input interface 18, to memory 20, and to datalink subsystem 24, respectively. Additionally, controller 12 includes at least first, second, and third outputs, which are operatively coupled to avionic display device 14, to memory 20, and to datalink subsystem 24, respectively. In further embodiments, avionic display system 10 may include a greater or lesser number of components, which may be interconnected in various different manners and utilizing any combination of wireless or wired (e.g., avionic bus) connections. Although avionic display system 10 is schematically illustrated in FIG. 1 as a single unit, the individual elements and components of avionic display system 10 can be implemented in a distributed manner using any number of physically-distinct and operatively-interconnected pieces of hardware or equipment.

Avionic display device 14 will often be affixed to the static structure of the A/C cockpit, such as a Head Up Display (HUD) or Head Down Display (HDD) unit. Alternatively, avionic display device 14 may assume the form of or include a movable display device (e.g., a pilot-worn display device) or a portable display device, such as an Electronic Flight Bag (EFB) or laptop computer, carried into the A/C cockpit by a pilot or other aircrew member. In still further embodiments, avionic display device 14 may not be carried by the A/C itself, such as when the A/C is included within an Unmanned Aerial Vehicle (UAV) system, and the operator or pilot of the UAV is remotely located relative to the UAV. Regardless, during operation of avionic display system 10, controller 12 drives avionic display device 14 to generate one or more graphical avionic displays thereon. For example, and as schematically indicated on the left side of FIG. 1, controller 12 may drive avionic display device 14 to generate a VSD 28 including, amongst other graphical elements, a computed vertical descent profile graphic 30 and one or more dynamically-adjusted drag device deployment cues 32. In further embodiments, controller 12 may drive avionic display device 14 or another display device included in system 10 to generate another type of two dimensional or three dimensional display including, but not limited to, a Primary Flight Display (PFD), a Multifunction Display (MFD), or a Navigation Display (ND), such as a Horizontal Navigational (HNAV) display (also commonly referred to as a "moving map" display).

Controller 12 may comprise or be associated with any suitable number of individual microprocessors, flight control computers, navigational equipment, memories (including or in addition to memory 20), power supplies, storage devices, interface cards, and other standard components known in the relevant field. Controller 12 may include or cooperate with any number of software programs (e.g., avionics display programs) or instructions (e.g., as stored in memory 20) designed to carry out the various methods, process tasks, calculations, and control/display functions described more fully herein. Although illustrated as a separate block in FIG. 1, memory 20 may be partially or wholly integrated into controller 12 in embodiments. In one embodiment, controller 12 and memory 20 are produced as an Application Specific Integrated Circuit (ASIC), a System-in-Package (SiP), or a microelectronic module. Memory 20 may store data utilized to support the operation of avionic display system 10. Furthermore, as noted above, memory 20 may store any number of databases 22, which may include navigational, weather, and/or terrain databases. One or more of databases 22 may be included in an Enhanced Ground Proximity Warning System (EGPWS) or a Runway Awareness and Advisory System (RAAS). More generally, controller 12 and the other components of avionic display system 10 may be included or cooperate with any number and type of systems commonly deployed onboard A/C including, for example, a Flight Management System (FMS), an Attitude Heading Reference System (AHRS), an Instrument Landing System (ILS), and an Inertial Reference System (IRS), to list but a few examples.

With continued reference to FIG. 1, ownship A/C data sources 16 include multiple onboard sensors and other components suitable for monitoring data useful in performing the processes described herein. The particular types of data collected by ownship A/C data sources 16 and provided to controller 12 will vary amongst different embodiments of avionic display system 10. Generally, ownship A/C data sources 16 will include a number of flight parameter sensors 34, which supply data to controller 12 describing various different operational conditions of the ownship A/C utilized in generating one or more avionic displays, such as VSD 28, including the instability predication and avoidance symbology described herein. Data provided by ownship A/C data sources 16 can include, without limitation: airspeed data; groundspeed data; altitude data; attitude data including pitch data and roll data; yaw data; geographic position data, such as Global Positioning System (GPS) data, data relating to gross A/C weight, time/date information, heading information, data describing atmospheric conditions, flight path data; glide slope signal reception data, track data, radar altitude data, geometric altitude data, wind speed and direction data, and data pertaining to fuel consumption, to list but a few examples. Finally, datalink subsystem 24 may assume any form enabling wireless bi-directional communication between the ownship A/C and one or more external data sources, such as an ATC and/or neighboring A/C. Datalink subsystem 24 may be utilized to provide ATC data to the ownship A/C and/or to send information from the ownship A/C to ATC in compliance with known standards and specifications.

Figure 2:
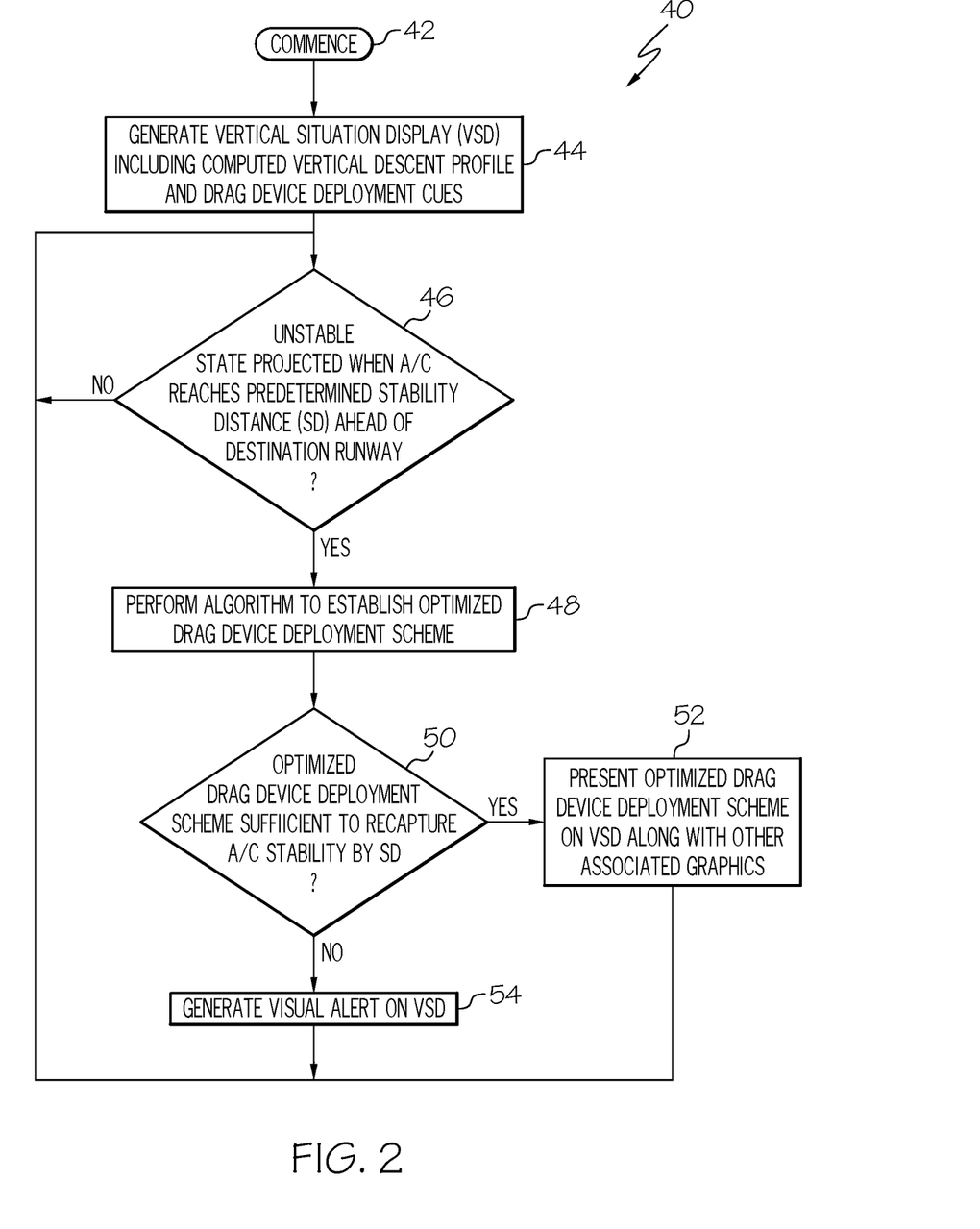
FIG. 2 is a flowchart setting-forth a process carried-out by the avionic display system shown in FIG. 1 to generate a vertical situation display (or other avionic display) including instability prediction and avoidance symbology, including as dynamically-adjusted drag device deployment cues, as illustrated in accordance with an exemplary and non-limiting embodiment of the present disclosure.

FIG. 2 is a flowchart setting-forth an exemplary instability prediction and avoidance process 40, which can be performed by controller 12 of avionic display system 10 (FIG. 1). During approach and landing of the ownship A/C, controller 12 may perform process 40 on an iterative basis to generate VSD 28 (and/or another avionic display) to include drag device deployment cues 32, which may be dynamically updated or adjusted to address projected or forecasted instability states of the A/C. Additionally, if such projected instability states cannot be remedied via changes in the drag device deployment scheme, controller 12 may generate corresponding alerts on VSD 28 pursuant to process 40. Instability prediction and avoidance process 40 includes a number of processes or steps, which are identified in FIG. 2 as STEPS 42, 44, 46, 48, 50, 92, 54. These steps are each discussed, in turn, below. Instability prediction and avoidance process 40 is presented by way of non-limiting example only and with the additional steps may be performed, certain steps may be omitted, or the sequence of steps may vary in alternative embodiments of process 40. While the following description primarily focuses on the generation of instability prediction and avoidance symbology on VSD 28, specifically, it will be appreciated that such instability prediction and avoidance symbology can be generated on other types of avionic displays (e.g., a PFD, MFD, and/or a HNAV display) in addition to or in lieu of VSD 28 in further embodiments of process 40 (FIG. 2) and avionic display system 10 (FIG. 1).

Figure 3:
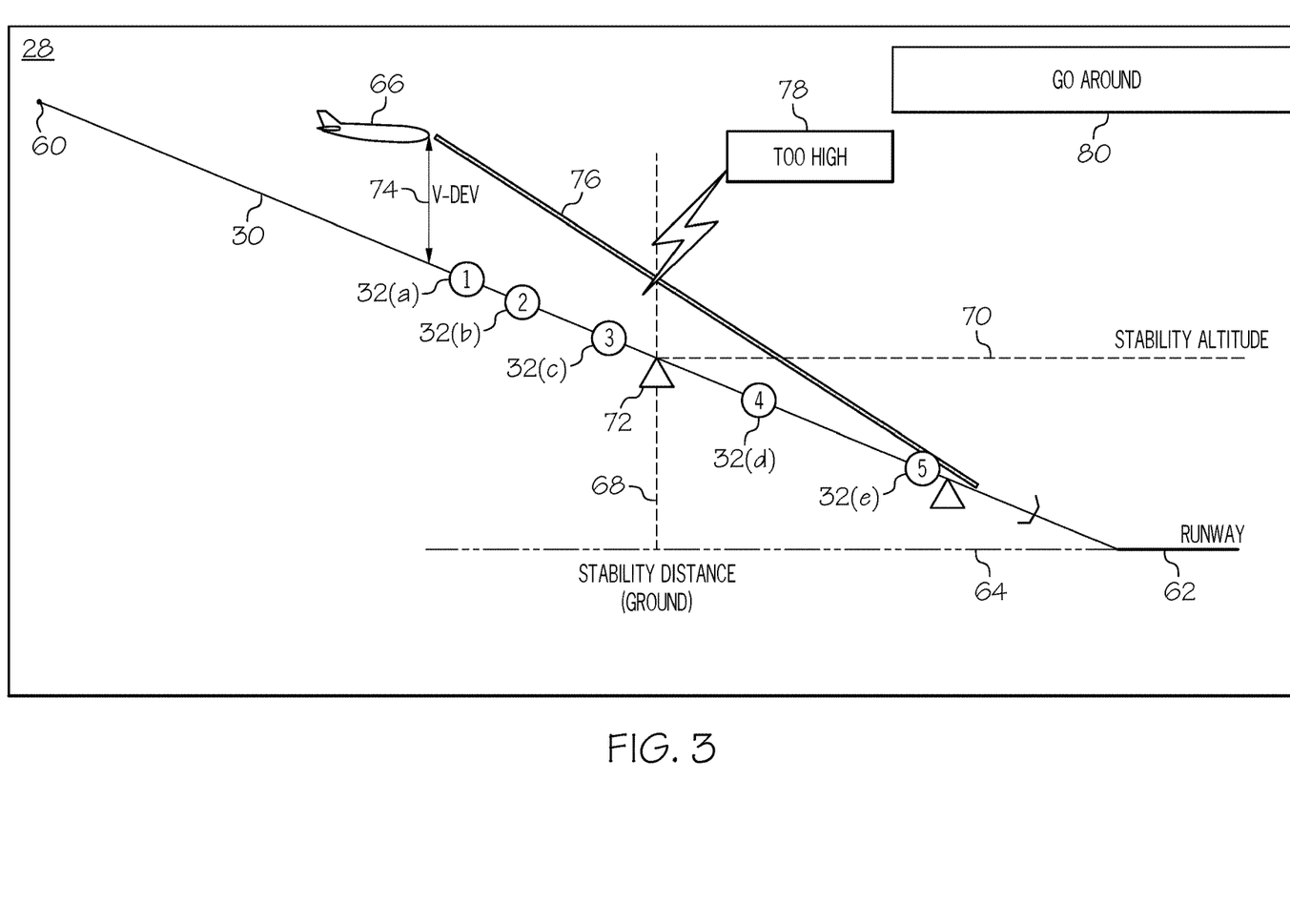
FIGS. 3-6 are screenshots of a VSD including dynamically-adjusted drag device deployment cues, which may be generated by the avionic display system shown in FIG. 1 during different approach and landing scenarios.

After instability prediction and avoidance process 40 commences (STEP 42), controller 12 generates VSD 28 on avionic display device 14 (FIG. 1). As indicated above, controller 12 generates VSD 28 to include a computed vertical descent profile graphic 30. Computed vertical descent profile graphic 30 visually represents an idealized or target vertical descent profile calculated by a computer or flight system, such as an FMS included within or associated with avionic display system 14. For example, the computed vertical descent profile represented by graphic 30 may be calculated by an FMS based upon wind speeds, glide path angles, obstacle avoidance data, A/C characteristics, and other parameters. In embodiments wherein the A/C is performing an ILS approach, computed vertical descent profile graphic 30 may partially or wholly overlap with a Glide Slope (G/S) beam. As shown in the screenshot of FIG. 3, computed vertical descent profile graphic 30 may be generated as one or more line segments extending from a descent point 60 (e.g., a Top of Descent or TOD point) to a touchdown reference point, such as the threshold or touchdown zone of a runway (represented in FIG. 3 by runway graphic 62). In the illustrated example, computed vertical descent profile graphic 30 is presented as a single line segment having a constant descent angle; however, in further embodiments, computed vertical descent profile graphic 30 may be produced to have multiple segments of varying slopes including, for example, one or more level-off segments.

During STEP 44 of instability prediction and avoidance process 40 (FIG. 2), controller 12 of avionic display system 10 (FIG. 1) may generate VSD 28 to include various other graphics in addition to computed vertical descent profile graphic 30. For example, as indicated in FIG. 3, controller 12 may generate VSD 28 to further include terrain graphics 64 and an ownship A/C icon 66. Terrain graphics 64 are generated as a relatively simple line segment in the example of FIG. 3. In other scenarios, terrain graphics 64 may be generated to depict uneven topology and may have other appearances, such as shaded or filled lower regions of VSD 28. Comparatively, ownship A/C icon 66 (particularly, the positioning of icon 66 on VSD 28) is representative of the current vertical position of the ownship A/C. Generally, the vertical distance between terrain graphics 64 and A/C icon 66 is scaled to denote the current Above Ground Level (AGL) altitude of the ownship A/C with respect to the surrounding terrain. Thus, as the vertical position of the ownship A/C varies with respect to ground level, so too will the vertical position of A/C icon 66 on VSD 28.

Controller 12 may generate VSD 28 to further include one or more drag device deployment cues 32 (FIG. 3). In the flight scenario of FIG. 3, drag device deployment cues 32 set-out the timing and sequence of drag device deployment, as corresponding to anticipated drag device deployment in the context of the computed vertical descent profile. Drag device deployment cues 32 are generated alongside computed vertical descent profile graphic 30 and visually indicate the anticipated timing of drag device deployment as the ownship A/C progresses along the vertical descent profile represented by graphic 30. Here, five drag device deployment cues 32 are shown and identified by reference numerals 32(*a*)-(*e*). The sequential position of cues 32(*a*)-(*e*) along vertical descent profile graphic 30 intuitively denotes the sequence and timing of the anticipated drag device deployment. In the present example, drag device deployment cues 32 are generated as circular markers, which contain numbers each identifying a particular drag device, such as a numbered flap, slat, or other high-lift device, with which the A/C is equipped. In further embodiments, drag device deployment cues 32 may be given various other appearances and may also include other types of drag devices, such as airbrakes. Furthermore, the number and positioning of drag device deployment cues 32, as appearing on VSD 28, may vary over time as controller 12 performs iterations of instability prediction and avoidance process 40.

As the ownship A/C progresses toward the destination runway represented by graphic 62, the ownship A/C will eventually reach the stability distance. As noted above, the stability distance is a predetermined horizontal (ground) distance, as measured between the A/C and a landing reference point, at which the A/C should be stabilized to proceed with the landing attempt. The landing reference point may be located at the threshold or touchdown zone of the destination runway represented by graphic 62 when the destination runway is known to avionic display system 10; e.g., due to pilot input data specifying the destination runway received via an FMS included in or associated with system 10. In this case, the precise horizontal (latitude and longitude coordinates) of the runway touchdown zone may be recalled from a runway or navigation database included within databases 22 and then utilized as the landing reference point. If the destination runway is not yet known to avionic display system 10 (e.g., if a pilot has entered the destination airport or airfield, but not yet specified the destination runway), a default landing reference point may be utilized, such as a central coordinate of the destination airfield. In the example of FIG. 3, the stability distance is graphically depicted on VSD 28 by a dashed vertical line 68, which intersects computed vertical descent profile graphic 30. In further embodiments, the stability distance may be graphically depicted on VSD 28 in another manner or may not be graphically depicted on VSD 28. An additional graphic, as represented in FIG. 3 by dashed line 70, further indicates the target HAT of the A/C when reaching the stability distance (hereafter, the "stability altitude"). The stability distance and the stability altitude intersect at a stability point, which is further represented on VSD 28 by triangular marker 72.

With continued reference to FIGS. 1-3, instability prediction and avoidance process 40 next advances to STEP 46 (FIG. 2) during which controller 12 of avionic display system 10 (FIG. 1) determines whether the A/C is predicted to be in a stabilized state when reaching the stability distance represented on VSD 28 by graphic 68 (FIG. 3). Controller 12 may project or forecast future A/C stability when arriving at the stability distance based upon any number of static or dynamic factors. Such factors may include, but are not limited to, active Auto Pilot (AP) modes, current A/C parameters, gross A/C weight, and A/C flight characteristics, such as the inherent stability of the ownship A/C and the A/C glide ratio. Current meteorological conditions (e.g., current temperatures; wind conditions; visibility conditions' the presence of rain, sleet, or snow; etc.) may also be considered in predicting the future A/C stability, whether such current meteorological conditions are measured utilizing flight parameter sensors 34, communicated to the ownship A/C via datalink subsystem 24, or a combination thereof. Similarly, near-term forecasted weather conditions, such as wind and temperature conditions, may also be considered during STEP 46. Of particular interest may be forecasted near surface wind conditions, which are likely to be encountered by the A/C when descending toward ground level on final approach. In forecasting weather conditions, meteorological trends may be taken into account, as well as historical weather conditions recalled from past metrological data stored in onboard database 22 and/or received from an external source via datalink subsystem 24.

The ownship A/C is considered stable when arriving at the stabilization distance if multiple predetermined stabilization parameters or conditions are satisfied. The stabilization parameters will vary amongst embodiments, but will often include constraints related to the A/C energy content when reaching the stability distance. For example, the A/C may be considered unstable if reaching stability distance (graphic 68, FIG. 3) in an over-energy state; that is, with an excessive airspeed or HAT that exceeds a target airspeed or HAT by greater than a maximum acceptable threshold. In such instances, the aircrew may be forced to abort the current landing attempt and initiate go-around. If touching down on the runway in an over-energy state, the A/C may be unable to adequately dissipate the remainder of its energy content during rollout and a runway excursion may occur. In certain implementations, an A/C may be considered unstable if reaching the stability distance (graphic 68, FIG. 3) in an under-energy state; that is, with an excessively low airspeed or HAT, which is below a target airspeed or HAT by more than a threshold amount. Additional description in this regard is provided below. A non-exhaustive list of additional criteria that may also be considered when determining whether the ownship A/C is stable upon reaching the stability distance includes: the frequency and severity of variations in pitch, A/C sink rate, A/C power settings, and landing gear configuration requirements. If the A/C is predicted to be sufficiently stable (e.g., in an acceptable energy state) when reaching the stability distance, process 40 loops and controller 12 continues to monitor for detection of a future predicted unstable state. If, instead, projecting or predicting that the A/C will be unstable when reaching the stability distance, controller 12 advances to STEP 48 of instability prediction and avoidance process 40 (FIG. 2), as described more fully below.

In the context of the screenshot shown in FIG. 3, VSD 28 presents an example of a flight scenario in which a future unstable A/C state is projected to occur absent alterations to the drag device deployment scheme. As indicated by A/C icon 66, the vertical A/C position is presently displaced from the computed vertical descent profile (graphic 30, FIG. 3) in an upward direction. This displacement between the vertical A/C position and the computed vertical descent profile is relatively significant, as emphasized in FIG. 3 by double-headed arrow 74. Under the present drag device deployment scheme conveyed by drag device deployment cues 32(*a*)-(*e*), the projected vertical profile of the ownship A/C (represented in FIG. 3 by graphic 76) is insufficient to enable the ownship A/C to recapture the computed vertical descent profile (graphic 30, FIG. 3) prior to the stability distance (graphic 68, FIG. 3). Instead, the projected vertical profile (graphic 76, FIG. 3) brings the A/C to the stability distance (graphic 68) at an excessive HAT relative to the computed vertical descent profile (graphic 30). If the disparity between the predicted HAT of the A/C and the target HAT determined by the computed vertical descent profile (corresponding to the intersection of graphics 30 and 68 in FIG. 3) exceeds a threshold value, controller 12 may project or predict the occurrence of A/C instability when reaching the stability distance. Such a projected future instability may be indicated on VSD 28, as indicated by graphic 78 (here, a text annunciation indicating the reasoning underlying the predicted A/C instability), although this is not necessary in all embodiments.

If, as indicated in FIG. 3, controller 12 predicts a future unstable state of the ownship A/C under present flight conditions, controller 12 advances to STEP 48 of instability prediction and avoidance process 40 (FIG. 2). During STEP 48, controller 12 preforms an algorithm to establish at least one modified or optimized drag device deployment scheme. In so doing, controller 12 may determine whether the predicted instability of the A/C when arriving at the stability distance (graphic 68, FIG. 3) can be precluded through the implementation of one or more modified drag device deployment schemes. Generally, a predicted over-energy may be addressed through earlier deployment of one or more available drag devices, a greater utilization of drag devices, or the usage of auxiliary drag devices (e.g., airbrakes and possibly the early deployment of landing gear) not previously considered in the original or presently-established drag device deployment scheme. Conversely, a predicted under-energy state may be addressed through delayed drag device deployment or non-usage of one or more drag devices previously identified for deployment. Still other predicted instabilities can be addressed through further modifications to the high-lift devices and other drag devices affecting A/C position, speed, and altitude including, for example, the avoidance of temporary high wind conditions.

If multiple optimized drag device deployment schemes are identified during STEP 48, the drag device deployment schemes may be sorted into a hierarchy based upon any number of criteria. Such selection criteria may include estimated noise emissions, fuel efficiency ratings, anticipated pilot workload, passenger comfort levels, and other such factors. As a more specific example, if two drag device deployment schemes are established (both of which are anticipated to preclude the predicted future A/C instability state), the drag device deployment scheme identified as having the lower fuel consumption requirements, the lower noise emission levels, and/or the greater likelihood of preserving passenger comfort (through the avoidance of more abrupt maneuvering) may be identified by controller 12 as the optimized drag device deployment scheme. Furthermore, in certain embodiments, such selection criteria may be customizable by or tailored to the preferences of a commercial operator, an air carrier, or Original Equipment Manufacturer (OEM). The drag device deployment scheme considered optimum or most favorable in the context of the selection criteria may then be presented on VSD 28 in the manner described below.

During STEP 48 and/or during STEP 50 of instability prediction and avoidance process 40 (FIG. 2), controller 12 determines whether implementation of the optimized drag device deployment scheme is sufficient to recapture A/C stability by the stability distance. If determining that implementation of the optimized drag device deployment scheme is sufficient to recapture A/C stability by the stability distance, controller 12 advances to STEP 52 of instability prediction and avoidance process 40 (FIG. 2). If, instead, determining that implementation of the optimized drag device deployment scheme is insufficient to recapture A/C stability by the stability distance, controller 12 progresses to STEP 54 of process 40 (FIG. 2) and generates a corresponding advisory alert or warning. The alert generated during STEP 54 may be a visual alert appearing on an avionic display generated by avionic display system 10, such as a textual annunciation appearing on an avionic display. In this case, the textual annunciation may appear on VSD 28 and/or on any other suitable avionic display including, but not limited to, a PFD, an ND, or a MFD. The particular avionic display or displays on which the textual annunciation (or other visual alert) may be produced will vary amongst embodiments and may, in certain instances, be determined by the OEM, airline, or the like. An example of such a text annunciation 80, as appearing on VSD 28, is shown in FIG. 3 and expresses an advisory alert recommending that the current landing attempt should be aborted and go around initiated. When produced, text annunciation 80 (or other visual alert) can be color coded to pre-established caution or warning color, such as amber or red. An animation (e.g., flashing) may be applied to text annunciation 80, if desired. In other embodiments, a different type of visual alert may be produced on VSD 28, a different type of alert (e.g., an audible alert) can be produced in addition to or in lieu of a visual alert, or no such alert may be generated. After generation of this alert, controller 12 then returns to STEP 46 of process 40 (FIG. 2) and again monitors for the projected future occurrence of an unstable state.

Figure 4:
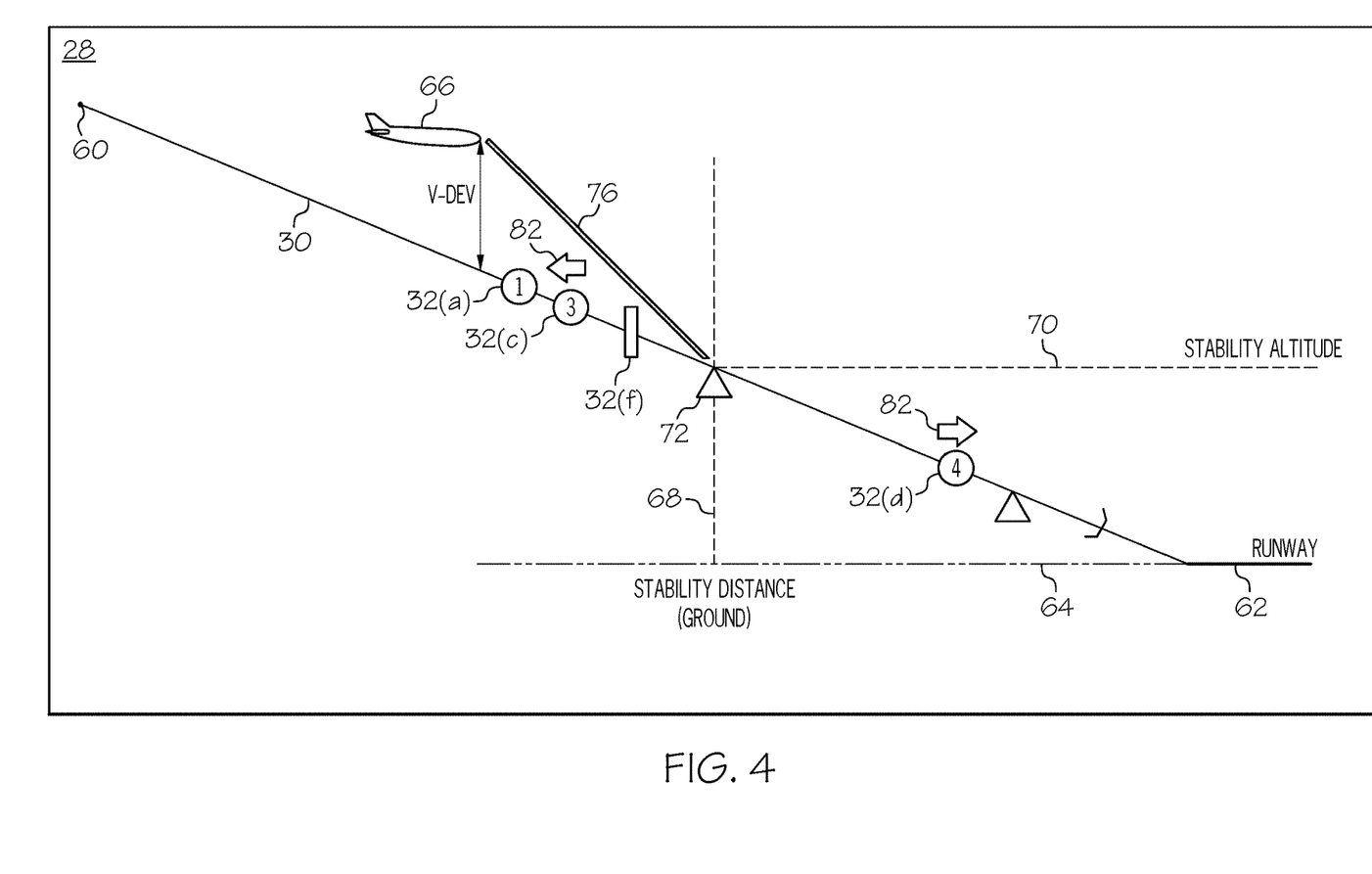

If determining that implementation of the optimized drag device deployment scheme is sufficient to recapture A/C stability by the stability distance, controller 12 next advances to STEP 52 of instability prediction and avoidance process 40 (FIG. 2). During STEP 52, controller 12 presents the optimized drag device deployment scheme on VSD 28. FIG. 4 depicts an updated screenshot of VSD 28 reflecting changes in symbology carried-out in accordance with STEP 52 of process 40 (FIG. 2). As may be appreciated by comparing FIGS. 3 and 4, drag device deployment cues 32 have been updated to collectively depict the newly-determined or optimized drag device deployment scheme. In this example, the utilization and timing of the drag device corresponding to deployment cue 32(*a*) remains unchanged; the drag devices corresponding to deployment cues 32(*b*), 32(*e*) are no longer utilized; the drag devices corresponding to deployment cues 32(*c*)-(*d*) are still utilized, while the anticipated timing of the deployment of the devices represented by cues 32(*c*)-(*d*) is adjusted; and a new drag device corresponding to deployment cue 32(*f*) has been introduced onto VSD 28. With respect to drag device deployment cue 32(*f*), in particular, deployment cue 32(*f*) is an airbrake deployment cue and is generated to have a unique appearance (here, a rectangular marker) as compared to deployment cues 32(*a*)-(*e*).

If desired, animations can be applied or complementary graphics may be generated when VSD 28 transitions from presenting a first (e.g., original) drag device deployment scheme to a newly-determined (e.g., optimized) drag device deployment scheme. Such graphics or animated transitions can include the fading-in of newly-added deployment cues, the fading-out of removed deployment cues, and the application of a sliding motion or similar animation indicating a change in timing and/or sequence of repositioned deployment cues. Similarly, various supplemental graphics may likewise be produced on VSD 28 to underscore or visually emphasize deployment cue repositioning; e.g., arrow icons 82 shown in FIG. 4 may be added to VSD 28 indicating the repositioning of deployment cues 32(*c*)-(*d*) and, thus, the adjustment in the anticipated time of deployment of the drag devices corresponding to cues 32(*c*)-(*d*).

After updating VSD 28 to present the optimized drag device deployment scheme (STEP 52), controller 12 returns to STEP 46 of process 40 (FIG. 2) and continues to monitor for forecasted unstable states of the ownship A/C when arriving at the stabilization distance (graphic 68, FIGS. 3-4). If A/C instability is again predicted, controller 12 performs additional iterations of process 40, as appropriate, to update VSD 28 on a repeated basis at a relatively rapid (e.g., real time or near real time) refresh rate. In this manner, controller 12 actively readjust the drag device deployment cues presented on VSD 28 or otherwise generates instability advisement alerts in response to variations in the current A/C flight parameters, changes in forecasted weather conditions, and other dynamic variables. Through the repeated execution of instability prediction and avoidance process 40, controller 12 thus leverages VSD 28 (and/or another avionic display) to provide a pilot with an intuitive visual aid as to predicted A/C instability during approach and landing. Furthermore, controller 12 indicates whether such instabilities can be precluded through the implementation of modified drag device deployment schemes, as indicated through adjustment of drag device deployment cues 32(*a*)-(*f*), or whether A/C instability may render advisable go-around maneuvers; e.g., as indicated by visual alerts generated on VSD 28, such as text annunciation 80. In so doing, avionic display system 10 favorably enhances pilot awareness and decision-making with respect to the anticipated occurrence and avoidance of A/C instability during approach and landing.

In the exemplary flight scenario described above in conjunction with FIGS. 3-4, A/C instability was projected due to an excessive HAT of the ownship A/C at the stability distance. In other embodiments, A/C instability may be projected for other reasons, such as an over-energy state resulting from by excessive airspeed when reaching the stability distance. Furthermore, other instability prediction and avoidance symbology can also be generated on VSD 28 (or other avionic display) in addition to or in lieu of that described above in conjunction with FIGS. 3-4. To further emphasize this point, an additional flight scenario in which controller 12 of avionic display system 10 (FIG. 1) may generate instability prediction and avoidance symbology on VSD 28 will now be described in conjunction with FIGS. 5-6. While the following description focuses on generation of such instability prediction and avoidance symbology on VSD 28 for the purposes of illustration, it is again emphasized that similar instability prediction and avoidance symbology may be generated on other types of avionic displays, such as a PFD, MFD, or ND (e.g., HNAV) display, in further embodiments of avionic display system 10.

Figure 5:
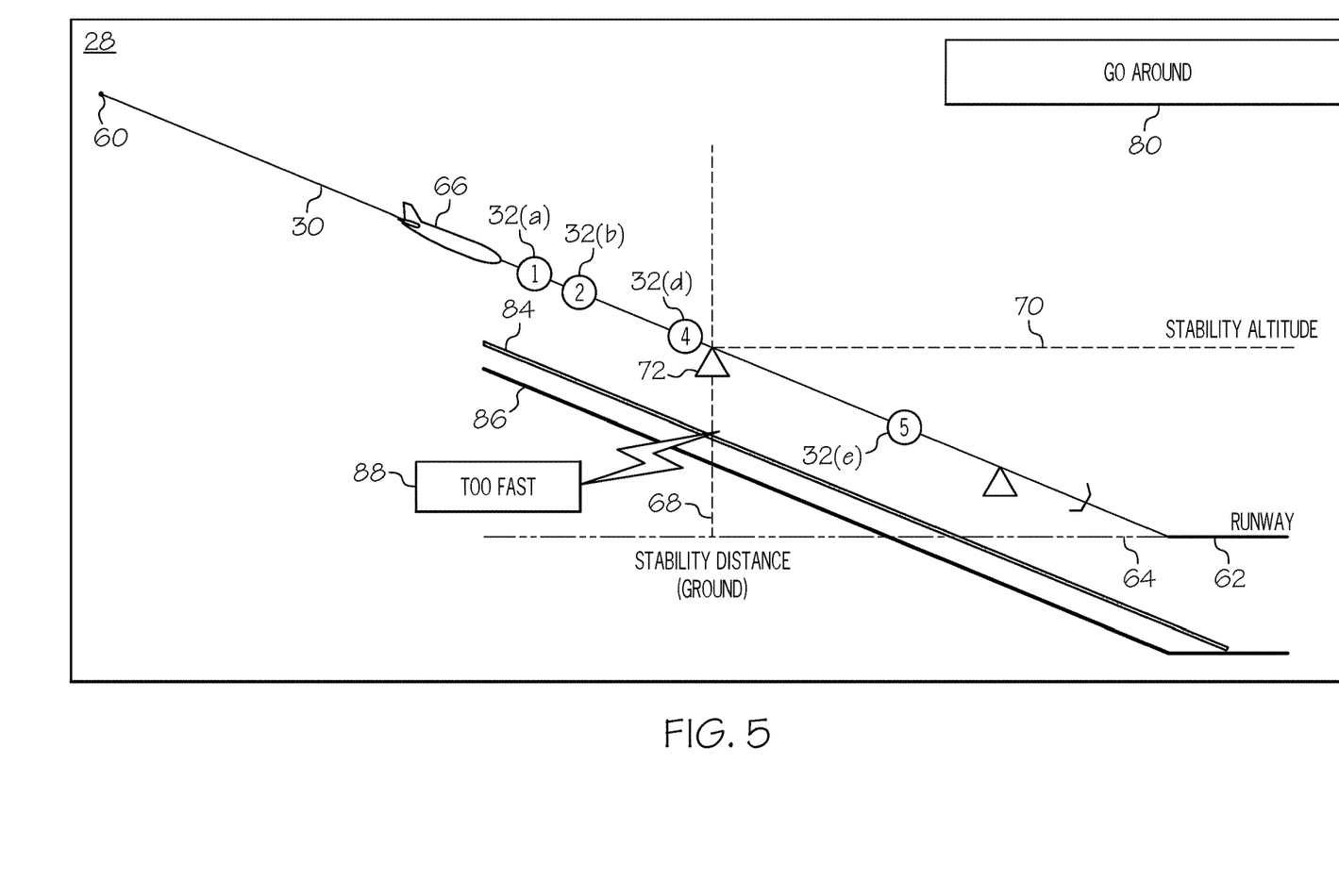
Figure 6:
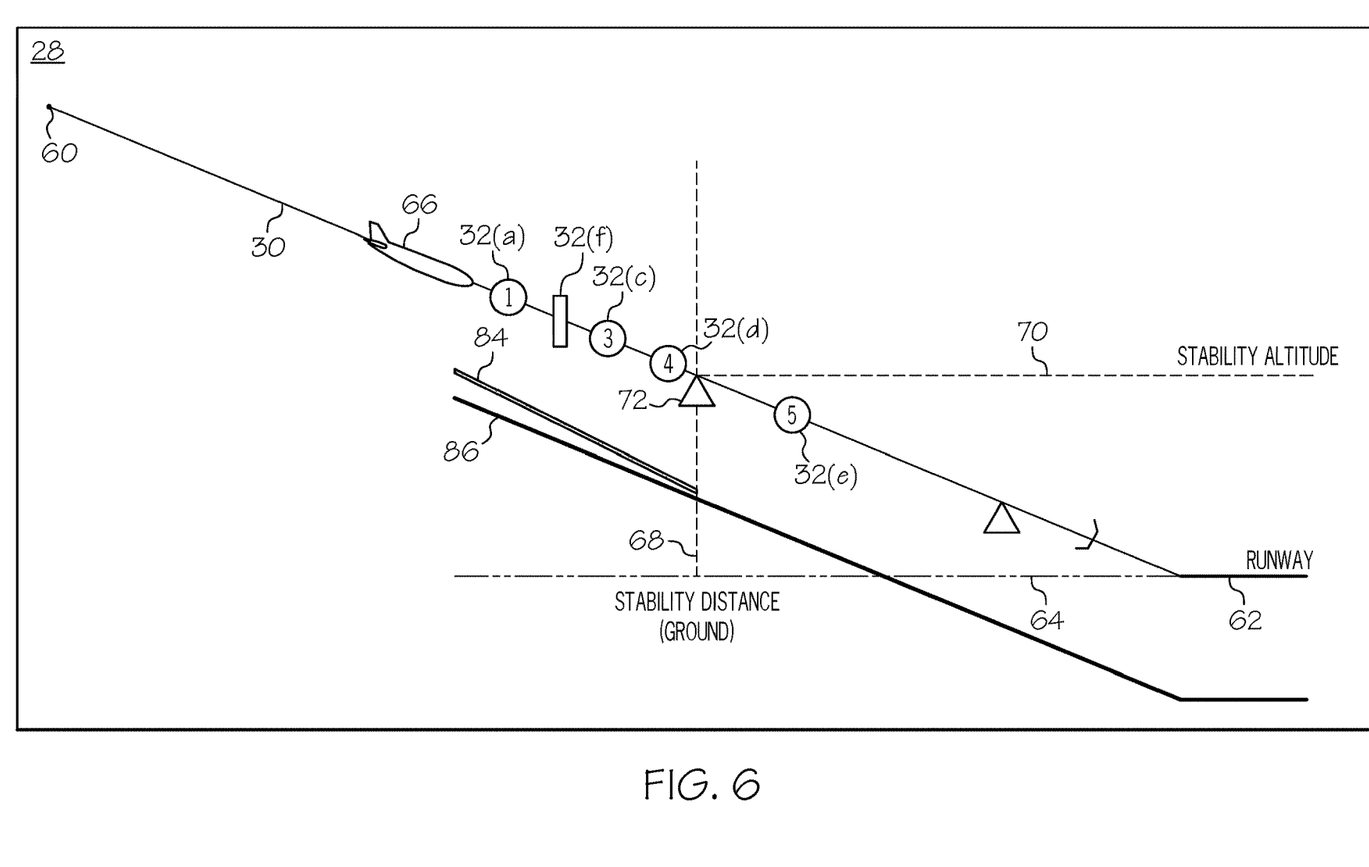

FIG. 5 is a screenshot of VSD 28, as depicted in a further exemplary flight scenario in which controller 12 predicts future instability when the A/C reaches the stability distance (graphic 68, FIG. 5) due to a projected or forecasted over-energy state of the ownship A/C. In this case, and in contrast to the exemplary flight scenario shown in FIG. 3, the current A/C vertical position (indicated by icon 66) coincides with the target vertical position specified by the computed vertical descent profile and represented by descent profile graphic 30. However, in this example, the future airspeed of the A/C projected to be excessively high when arriving at the stability distance (graphic 68, FIG. 5) with implementation of the drag device deployment scheme denoted by deployment cues 32(*a*), 32(*b*), 32(*d*), and 32(*e*) in the illustrated flight scenario. Visual alerts (e.g., a text annunciation) or other graphics may be produced on VSD 28, as appropriate, to increase pilot awareness of this predicted future excessive airspeed. For example, as indicated in a lower portion of FIG. 5, a projected vertical speed profile 84 may be further generated on VSD 28 as, for example, a line segment extending from a horizontal position corresponding to the nose of A/C icon 66 toward runway graphic 62. For visual clarity, projected vertical speed profile 84 is not produced in the immediate vicinity of computed vertical descent profile graphic 30 on VSD 28, but rather underneath profile graphic 30, as is a target or model vertical speed profile 86 corresponding to the computed vertical descent profile.

In the flight scenario of FIG. 5, projected vertical speed profile 84 fails to converge with model vertical speed profile 86 ahead of the stability distance (graphic 68) or, at minimum, fails to enter into sufficient proximity with speed profile 86 to satisfy a maximum acceptable speed deviation threshold. Consequently, and as indicated by warning indicator 88, the ownship A/C is predicted to have an excessive airspeed when reaching the stability distance (graphic 68), and an unstable A/C state is projected to occur at this future juncture in time. Stated differently, controller 12 establishes a stability distance from a destination runway approached by the A/C, estimates a future airspeed of the A/C at the stability distance, and then projects or predicts the occurrence of an unstable A/C state if the future airspeed of the A/C exceeds a target airspeed by more than a maximum acceptable threshold. In accordance with STEP 50 of process 40 (FIG. 2), controller 12 may now determine whether this anticipated unstable A/C state can be avoided through the implementation of an optimized drag device deployment scheme, given current A/C parameters, current weather conditions, forecasted weather conditions, and other factors, including those previously described. If an optimized drag device deployment scheme sufficient to avoid the impending predicted A/C instability cannot be established, controller 12 advances to STEP 54 and generates a corresponding visual alert on VSD 28 (or another avionic display). As indicated above, this visual alert may assume the form of an advisory text message or annunciation, such as the GO AROUND text annunciation shown in the upper left corner of FIG. 5.

If controller 12 is instead able to identify an optimized drag device deployment scheme sufficient to avoid the predicted unstable A/C state, the optimized drag device deployment scheme is presented on VSD 28 (STEP 52, FIG. 2). The optimized drag device deployment scheme may be presented on VSD 28 (or on another avionic display) through a visual adjustment to the drag device deployment cues corresponding to the newly-derived drag device deployment scheme. This may be appreciated by referring to the successive screenshot of VSD 28 shown in shown in FIG. 6 in which an optimized or modified drag device deployment scheme, which can be implemented to preclude the predicted future A/C instability state, is visually presented. As may be appreciated by comparing FIG. 6 to FIG. 5, two drag device deployment cues (cues 32(*b*), (*e*)) have been readjusted; drag device deployment cue 32(*b*) has been eliminated; and new deployment cues (deployment cue 32(*c*) and airbrake deployment cue 32(*f*)) have been introduced onto VSD 28. Correspondingly, and as can be seen in a lower portion of VSD 28 in FIG. 6, the newly-determined drag device deployment scheme is projected to bring the airspeed of the ownship A/C (represented by projected vertical speed profile 84) into conformance with the target airspeed (represented by model vertical speed profile 86) prior to juncture at which the ownship A/C reaches the stability distance represented on VSD 28 by graphic 68.

The foregoing has thus provided exemplary embodiments of an avionic display systems and method for generating avionic displays including instability prediction and avoidance symbology. The instability prediction and avoidance symbology can include dynamically-adjusted drag device deployment cues, which are generate on VSD or other avionic display. Collectively, the drag device cues form an optimized drag device deployment scheme, which may be determined by the avionic display system utilizing a drag device deployment optimization algorithm. Providing that the revised deployment scheme is sufficient to cure the predicted A/C instability, the avionic display system may then present the optimized drag device deployment scheme on the VSD as a series of drag device deployment cues, which indicate the order and timing at which a pilot should deploy one or more available drag devices. The VSD may be generated to include additional symbology useful in piloting an A/C to avoid predicted unstable states and/or to recapture a computed vertical descent profile from which the A/C has deviated. The avionic display system may generate a visual warning on the VSD if the algorithm is unable to establish an optimized drag device deployment scheme; e.g., due to an inability to recapture the calculated vertical descent profile at an acceptable energy state. In this manner, the above-described avionic display system favorably enhances pilot awareness and decision-making in anticipated and avoiding of A/C instability during approach and landing.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An avionic display system, comprising:
    an avionic display device on which an avionic display including a vertical descent profile graphic that visually represents an optimal vertical descent profile is displayed; and
    a controller operably coupled to the avionic display device and configured to:
        project a reference descent path based on an aircraft's present flight conditions, for the aircraft to operate on the optimal vertical descent profile during a descent or approach;
        predict when an unstable aircraft state is projected to occur for the aircraft on the reference descent path;
        wherein an optimized drag device deployment scheme defines a sequence and timing of deployment of available drag devices on the aircraft, determine whether implementation of the optimized drag device deployment scheme can enable the aircraft to remain on the reference descent path while preventing the projected occurrence of the unstable aircraft state; and
        when the aircraft can remain on the reference descent path and prevent occurrence of the predicted unstable aircraft state by implementation of the optimized drag device deployment scheme,
        (i) generate symbology on the avionic display that visually indicates the optimized drag device deployment scheme, the symbology including rendering a uniquely identifying drag device deployment cue for each drag device in the optimized drag device deployment scheme at a location alongside the vertical descent profile graphic that visually indicates the anticipated timing of drag device deployment;
        (ii) continuously forecast whether a future unstable aircraft state is predicted to occur when arriving at a stabilization distance absent alterations to the implemented optimized drag device deployment scheme; and
        (iii) dynamically adjust the drag device deployment cues, responsive to forecasted future unstable aircraft states.

2. The avionic display system of claim 1 wherein the avionic display comprises a Vertical Situation Display (VSD), and wherein the controller is configured to generate the symbology indicative of the optimized drag device deployment scheme on the VSD if determining that occurrence of the projected unstable aircraft state can be prevented by implementation of the optimized drag device deployment scheme.

3. The avionic display system of claim 2 wherein the controller is further configured to produce a visual alert on the VSD if determining that implementation of the optimized drag device deployment scheme is insufficient to prevent occurrence of the projected unstable aircraft state.

4. The avionic display system of claim 1 wherein the controller, when projecting whether an unstable aircraft state will occur during the approach, is configured to:

establish a stability altitude at a destination runway approached by the aircraft;

estimate a future airspeed of the aircraft at the stability altitude; and if the future airspeed of the aircraft exceeds a target airspeed by more than a maximum acceptable threshold, project the occurrence of an unstable aircraft state.

5. The avionic display system of claim 1 wherein the controller is configured to project whether an unstable aircraft state will occur during the approach based, at least in part, on forecasted wind and temperature conditions.

6. The avionic display system of claim 1 wherein the avionic display comprises a Vertical Situation Display (VSD), and wherein the controller is further configured to:
produce the VSD to include the reference descent profile.

7. The avionic display system of claim 6 wherein the controller is configured to generate the deployment cues to have a sequential positioning along the computed vertical descent profile graphic denoting the anticipated timing for the deployment of the drag devices.

8. The avionic display system of claim 6 wherein at least one deployment cue is representative of an anticipated timing for airbrake deployment.

9. The avionic display system of claim 6 wherein the controller is further configured to generate the VSD to include a projected vertical profile of the aircraft corresponding to the optimized drag device deployment scheme.

10. The avionic display system of claim 1 wherein the optimized drag device deployment scheme is one of multiple optimized drag device deployment schemes that can enable the aircraft to stay on the reference descent path while preventing the projected occurrence of the unstable aircraft state; and the controller is further configured to:
select a preferred optimized drag device deployment scheme from the multiple optimized drag device deployment schemes based upon each of estimated noise emissions, estimated fuel consumption, and estimated passenger comfort levels; and generate the symbology on the avionic display that visually indicates the preferred optimized drag device deployment scheme on the vertical descent profile by rendering a uniquely identifying drag device deployment cue for each drag device in the preferred optimized drag device deployment scheme.

11. The system of claim 1, wherein the avionic display device is affixed to a static structure of an aircraft cockpit.

12. The system of claim 1, wherein the avionic display device is on a portable device.

13. A method carried-out by an avionic display system including an avionic display device to which a controller is operably coupled, the method comprising:

generating a Vertical Situation Display (VSD) on the avionic display device;

visually representing an optimal vertical descent profile as a vertical descent profile graphic on the VSD;

utilizing the controller, projecting a reference descent path based on an aircraft's present flight conditions, for the aircraft to operate on the optimal vertical descent profile during a descent or approach;

utilizing the controller, projecting whether an unstable aircraft state will occur for the aircraft on the reference descent path;

when an unstable aircraft state is projected to occur, wherein an optimized drag device deployment scheme defines a sequence and timing of deployment of available drag devices on the aircraft, determining whether implementation of the optimized drag device deployment scheme can enable the aircraft to remain on the reference descent path while preventing occurrence of the projected unstable aircraft state; and when the aircraft can remain on the reference descent path and prevent occurrence of the predicted unstable aircraft state by implementation of the optimized drag device deployment scheme, (i) generating symbology on the avionic display that visually indicates the optimized drag device deployment scheme, the symbology including rendering a uniquely identifying drag device deployment cue for each drag device in the optimized drag device deployment scheme at a location alongside the vertical descent profile graphic that visually indicates the anticipated timing of drag device deployment;

(ii) continuously forecasting whether a future unstable aircraft state is predicted to occur when arriving at a stabilization distance absent alterations to the implemented optimized drag device deployment scheme; and (iii) dynamically adjusting the drag device deployment cues, responsive to forecasted unstable aircraft states; and when the aircraft cannot remain on the reference descent path and prevent occurrence of the predicted unstable aircraft state by implementation of the optimized drag device deployment scheme, producing a visual alert on the VSD or another avionic display.

14. The method of claim 13 wherein projecting whether an unstable aircraft state will occur during the approach flown by the aircraft comprises:

establishing a stability altitude at a destination runway approached by the aircraft;

estimating a future airspeed of the aircraft at the stability altitude; and if the future airspeed of the aircraft exceeds a target airspeed by more than a maximum acceptable threshold, projecting the occurrence of an unstable aircraft state.

15. The method of claim 13 further comprising producing the VSD to include a projected vertical speed profile corresponding to the optimized drag device deployment scheme.

* * * * *